United States Patent
Bohm

(10) Patent No.: US 8,055,825 B2
(45) Date of Patent: *Nov. 8, 2011

(54) DIGITAL DEVICE INTERCONNECT METHOD

(75) Inventor: Mark R. Bohm, Village of Bear Creek, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/762,823

(22) Filed: Apr. 19, 2010

(65) Prior Publication Data

US 2010/0205339 A1    Aug. 12, 2010

Related U.S. Application Data

(63) Continuation of application No. 11/428,211, filed on Jun. 30, 2006, now Pat. No. 7,702,832.

(60) Provisional application No. 60/804,141, filed on Jun. 7, 2006.

(51) Int. Cl.
*G06F 13/42* (2006.01)

(52) U.S. Cl. .................. 710/105; 710/305; 710/313

(58) Field of Classification Search ............. 710/105, 710/305, 313, 315

See application file for complete search history.

(56) References Cited

U.S. PATENT DOCUMENTS 4,847,867 A  *  7/1989 Nasu et al. ............. 375/257

(Continued)

FOREIGN PATENT DOCUMENTS

EP    1615136    1/2006

OTHER PUBLICATIONS

USB-Implementers Forum Inc., Universal Serial Bus Specification, Rev 2.0, Apr. 27, 2000, pp. 118-170.*

(Continued)

*Primary Examiner* — Mark Rinehart
*Assistant Examiner* — Nimesh G Patel
(74) *Attorney, Agent, or Firm* — Meyertons Hood Kivlin Kowert & Goetzel, P.C.; Jeffrey C. Hood

(57) ABSTRACT

A simple clock source synchronous DDR data transfer mechanism may be combined with static bus state signaling to replace a complex bus (e.g. USB) with an easy to implement digital serial interconnect bus. This may eliminate various pull-up/pull-down resistors required in USB, and enable the interconnect bus to operate with little or no leakage current when the bus is in an idle state, or data transmission state. All required functionality may be implemented using only two signal pins. The interconnect bus may also enable silicon solutions for high speed USB that do not require a PLL, since the clock may be provided by the transmission source and may thus not need to be recovered from the serial data stream. The digital serial interconnect bus may provide an easy reuse mechanism for USB silicon by enabling a designer to remove the analog PHY and replace it with a serial digital I/O transfer mechanism, while retaining the IP's USB timers, and other protocol specific features.

59 Claims, 1 Drawing Sheet

U.S. PATENT DOCUMENTS

| | | | |
|---|---|---|---|
| 5,793,993 A | | 8/1998 | Broedner et al. |
| 6,073,186 A | * | 6/2000 | Murray et al. .................. 710/11 |
| 6,145,039 A | | 11/2000 | Ajanovic et al. |
| 6,816,931 B2 | * | 11/2004 | Shih ................................ 710/62 |
| 7,076,683 B2 | * | 7/2006 | Saito et al. .................... 713/601 |
| 2002/0172290 A1 | | 11/2002 | Chorpenning et al. |
| 2004/0071015 A1 | * | 4/2004 | Borkenhagen et al. .. 365/189.05 |
| 2005/0071707 A1 | * | 3/2005 | Hampel ........................ 713/600 |

OTHER PUBLICATIONS

"ALTERA: Using Source-Synchronous Signaling with DPA in Stratix GX Devices—Application Note 236"; Altera Corporation; Jan. 2003, version 1.1; 18 pages.

"Cobra Specifications for Sampler Control Board—Draft"; Retrieved from the Internet: <http://www.jb.man.ac.uk/~tsi/projects/cobradoc01.html>; Nov. 13, 2000; 4 pages.

* cited by examiner

DIGITAL DEVICE INTERCONNECT METHOD

PRIORITY CLAIM

This application is a continuation of utility application Ser. No. 11/428,211 titled "Low Power and Low Pin Count Bi-Directional Dual Data Rate Device Interconnect Interface", filed on Jun. 30, 2006 now U.S. Pat. No. 7,702,832, whose inventor is Mark. R. Bohm, and which itself claims benefit of priority of provisional application Ser. No. 60/804,141 titled "Low Power and Low Pin Count Bi-Directional Dual Data Rate Device Interconnect Interface", filed on Jun. 7, 2006, whose inventor is Mark. R. Bohm, and which is hereby incorporated by reference as though fully and completely set forth herein.

BACKGROUND OF THE INVENTION

1. Field of the Invention

The present invention relates generally to digital device interfaces, and more specifically to low pin count interfaces to interconnect USB devices on a circuit board.

2. Description of the Related Art

The Universal Serial Bus (USB) allows coupling of peripheral devices to a computer system. USB is a serial cable bus for data exchange between a host computer and a wide range of simultaneously accessible devices. The bus allows peripherals to be attached, configured, used, and detached while the host is in operation. For example, USB printers, scanners, digital cameras, storage devices, card readers, etc. may communicate with a host computer system over USB. USB based systems may require that a USB host controller be present in the host system, and that the operating system (OS) of the host system support USB and USB Mass Storage Class Devices.

USB devices may communicate over the USB bus at low-speed (LS), full-speed (FS), or high-speed (HS). A connection between the USB device and the host may be established via digital interconnect such as Interchip USB, ULPI, UTMI, etc., or via a four wire interface that includes a power line, a ground line, and a pair of data lines D+ and D−. When a USB device connects to the host, the USB device may first pull a D+ line high (the D− line if the device is a low speed device) using a pull up resistor on the D+ line. The host may respond by resetting the USB device. If the USB device is a high-speed USB device, the USB device may "chirp" by driving the D− line high during the reset. The host may respond to the "chirp" by alternately driving the D+ and D− lines high. The USB device may then electronically remove the pull up resistor and continue communicating at high speed. When disconnecting, full-speed devices may remove the pull up resistor from the D+ line (i.e., "tri-state" the line), while high-speed USB devices may tri-state both the D+ and D− lines.

Embedded and portable products are often implemented with a USB interface because of their popularity, driver support, interoperability and relative low cost of USB devices. However, standard USB devices include an analog physical layer (PHY) component, along with pull-up and pull-down resistors that constantly consume power (even when in suspend or standby). These aspects of USB make it less attractive to power conscious embedded devices, particularly those operating from a battery. It has therefore become desirable to provide USB connectivity, without the added power consumption of analog PHYs and pull-up and pull-down resistors.

The USB-IF (USB Implementers Forum) created and released an Interchip 1.0 specification addressing some of the analog PHY issues of USB, and is therefore more attractive for portable devices, but the interface is not capable of HS (high speed) USB transfer speeds, and retains the differential data (D+/D−) aspect of USB, which typically requires eye diagrams, clock recovery and synchronization. This increases the complexity of the implementation over a straightforward digital clock and data interface, and limits the transmission length to 10 cm or less. It also makes it very difficult to carry this scheme to 480 Mb/s performance.

Various interface solutions have been implemented and proposed in the past. For example, U.S. Pat. No. 4,785,396 defines use of Manchester encoding over differential data lines. This requires clock recovery and is very similar to Interchip USB in terms of its limitations. It is also constructed to connect multiple devices together, instead of the point-to-point structure inherent to USB. It uses pull-ups to indicate idle state, and uses other "static" states to indicate collision detection and valid data. It doesn't have the ability to communicate USB Reset, or USB Resume without an intervening protocol, which would unnecessarily burden the implementation. Also, the defined arbitration mechanism can be deemed unnecessary since it is already defined in USB upper level protocol.

U.S. Pat. No. 5,7903,993 defines a separate interrupt line to allow "slave" devices to operate on a bus with the single master. It also defines a command sequence, which is a packet protocol that would essentially act as a header to all USB traffic, or would need to be used to transmit control information such as a USB Reset. This would not work well in a USB environment without substantial modification to the USB Device itself.

U.S. Pat. No. 4,847,867 defines use of a bidirectional data line, but the master sources the clock at all times. The protocol uses the rising edge of the clock to send and the falling edge to receive data.

U.S. Pat. No. 6,073,186 defines use of a bidirectional data line, but the master sources the clock at all times. This would not provide a robust solution with a dual data rate scheme over longer circuit trace lengths. It would therefore not be viable for certain applications. Also, no provision is made for static signaling such as USB Reset and Resume.

U.S. Pat. No. 7,003,585 B2 defines use of a transceiver scheme for clock extraction, and defines a transport protocol for the interface that is redundant in a USB environment. This is not a digital replacement serial bus for USB, and would therefore not meet the requirements for a portable device. It is designed mainly for long cable runs (an example of 75' is given in the background section).

U.S. Pat. No. 5,970,096 describes a bus structure between one master and one or many slave devices. It describes an idle condition using the static condition of the interface, but no provision is made for USB Reset or Resume through static states on the bus.

US Patent Application US 2002/0095541 A1 describes an analog serial data transfer scheme and doesn't apply to digital serial transfers.

US Patent Application US 2004/0263321 A1 describes a serial data transmission system that can also supply power from a transmission source to a receiver. It focuses on power delivery and doesn't provide static states for USB Reset or USB Resume. It also wouldn't map successfully to a simple two-wire scheme to replace standard USB.

Other corresponding issues related to the prior art will become apparent to one skilled in the art after comparing such prior art with the present invention as described herein.

SUMMARY OF THE INVENTION

Various embodiments of the present invention provide for USB connectivity without the added power consumption of analog PHYs and pull-up and pull-down resistors. Some embodiments comprise a simple low-pin count interface to interconnect USB devices on a circuit board. In one set of embodiments, a 2-wire digital bus may be configured to interconnect USB devices and/or controllers without using a USB PHY or USB cabling. The interconnected devices and/or controllers may typically be non-removable, but may be—in certain embodiments—removable modules such as smart cards or expansion "daughter" boards. In certain embodiments, the simple low pin count interface is not used as a plug-and-play replacement for standard USB, or IEEE1394, where peripherals are attached and/or detached routinely.

One embodiment comprises a 2-wire bidirectional bimodal bus that allows simultaneous host and device connectivity over the same interface, allowing a USB device, e.g. a cell phone, to appear as a USB device to an external PC, while also appearing as a USB host to a connected peripheral, such as a card reader. In one set of embodiments, the 2-wire bidirectional bimodal bus may be a 2-wire serial 240 Mhz DDR interconnect with one clock line, and one data line. The clock and data may only transition during an active transfer. The data may be clocked on rising and falling edges of the clock, thus a 480 Mbit USB High-Speed data rate can be maintained. The clock may be source synchronous with the data. This may simplify the design of both the IC's and printed circuit boards comprised in systems configured with the 2-wire bidirectional bimodal bus.

Static states, or no active data transmission states may be configured to allow for the following USB functionality:

USB Idle (CLOCK line high, DATA line low) for 1 or more clock periods;

USB Attach or Resume (CLOCK line low, DATA line high), for 1 ms, to match current USB specification requirements;

USB Suspend, identical to idle state, but the time period may be 3 ms to match current USB specification requirements; and USB Reset (CLOCK line low, DATA line low) for 2.5 µs or 10 ms to match current USB specification requirements.

In general, various embodiments of the invention may combine a simple clock source synchronous DDR data transfer mechanism with static bus state signaling to replace a complex bus like USB with an easy to implement digital serial interconnect bus. This may eliminate the various pull-up and pull-down resistors required in USB, and enable the interconnect bus to operate with little or no leakage current when the bus is in an idle state, or data transmission state. All of the required functionality may be implemented using only two signal pins. The interconnect bus may also enable silicon solutions for HS USB that do not require a PLL, since the clock may be provided by the transmission source and may thus not need to be recovered from the serial data stream. Various embodiments of the invention may provide an easy reuse mechanism for USB silicon by enabling a designer to remove the analog PHY and replace it with a serial digital I/O transfer mechanism, while retaining the IP's USB timers, and other protocol specific features.

BRIEF DESCRIPTION OF THE DRAWINGS

A better understanding of the present invention may be obtained when the following detailed description is considered in conjunction with the following drawings, in which.

Figure 1:
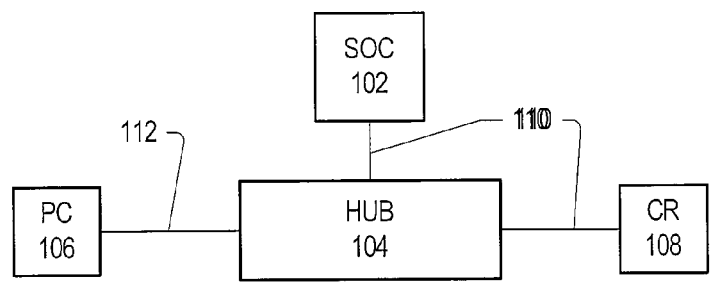
FIG. 1 is a block diagram of one embodiment in which a 2-wire bidirectional bimodal bus is used to couple a system on a chip (SOC) and a card reader (CR) to a USB hub.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (e.g., having the potential to or being able to in some embodiments), not a mandatory sense (i.e., must). The term "include", and derivations thereof, mean "including, but not limited to". The term "coupled" means "directly or indirectly connected".

DETAILED DESCRIPTION OF THE PREFERRED EMBODIMENTS

In one set of embodiments, a 2-wire (or at least 2-wire) digital bus may be configured to interconnect USB devices and controllers without using a USB physical layer (PHY) or USB cable. One wire may be a bidirectional clock (CLK) line/signal and the other wire may be a bidirectional data line/signal. In certain embodiments, the clock signal may only be active during a data transfer, and data may be clocked on rising and falling edges of the clock, thereby implementing a double data rate (DDR) transfer protocol. The transmitting device may source the CLK signal simultaneously and synchronously with the data, while the receiving device may clock the data during transitions of the clock line. In one embodiment, the bus may comprise one or more double data rate (DDR) data lines, which may all be source synchronous with the CLK line. Voltage levels may be process/device specific. FIG. 1 illustrates a block diagram of an exemplary system in which a 2-wire bidirectional bimodal bus 110 is used to couple a system on a chip (SOC) 102 and a card reader (CR) 108 to a USB hub 104. A personal computing (PC) system 106 may also be coupled to USB hub 104 through a standard USB connection 112.

In one set of embodiments, SOC 102 (which may be comprised in a cell phone) may be docked to PC 106 through HUB 104 as a peripheral USB device, while also operating as a USB host to another connected peripheral USB device, in this case CR 108. By coupling CR 108 to USB hub 104 via 2-wire bidirectional bimodal bus 110, and also coupling SOC 102 to USB hub 104 via 2-wire bidirectional bimodal bus 110, CR 108 may be recognized as a peripheral USB device by both PC 106 and SOC 102, while SOC 102 may be recognized as a peripheral USB device by PC 106, and as a USB host by CR 108.

As stated above, 2-wire bidirectional bimodal bus (or interface) 110 may comprise a CLK line and a data line, where a combination of states of the CLK line and the data line may be configured to implement select USB functionality to allow USB connectivity via the 2-wire bus. For example, the USB Idle state may be implemented by holding the CLK line in a high state while holding the data line in a low state. Similarly, the USB Reset state may be implemented by holding both the CLK line and the data line in a low state, and the USB Resume/Connect state may be implemented by holding the CLK line in a low state while holding data line in a high state. USB Data Transmit/Receive operations may be achieved by using the CLK signal to clock data transmitted over the data line.

In order to insure compliance with USB 2.0 requirements, the required effective data transfer rate of 480 Mb/s may be achieved by implementing 2-wire bus 110 as a DDR bus with the CLK signal driven at 240 MHz. No bit stuffing may be required, and by maintaining USB Reset/Resume timing, existing internal timers may be re-used on a USB function that normally connects to a standard PHY. The CLK signal and data signal may be generated as source synchronous signals, making any data rate possible as required. For example, in one set of embodiments the CLK signal may be driven at 533 MHz, which, in case of a DDR transfer configuration, may achieve an effective data rate of 1066 Mb/s. Interfaces for 2-wire bus 110 may be implemented with standard DDR capable input/output (I/O) pads, using spread spectrum clock/data lines to reduce spikes due to electromagnetic interference (EMI). Source synchronous data and clock signals would both spread synchronously.

In some embodiments, a wide frequency tolerance may allow for implementing the CLK signal using simpler and/or easier mechanisms than a phase-locked loop (PLL), using, for example, a ring oscillator instead. For example, for USB 2.0, a 400-480 Mb/s rate may be achieved with a 200 MHz-240 MHz clock tolerance for a DDR transfer mechanism. The specified protocol for 2-wire bus 110 may especially be applicable to the upper USB protocol, where error correction code (ECC), data corruption and data arbitration are handled (among others), since only four basic states may be defined, namely USB Idle, USB Reset, USB Resume/Connect and USB Data Transfer. In preferred embodiments, 2-wire bus 110 may generally be used for point-to-point interconnect, e.g. host to device, and may remain idle when no data is transmitted.

Figure 2:
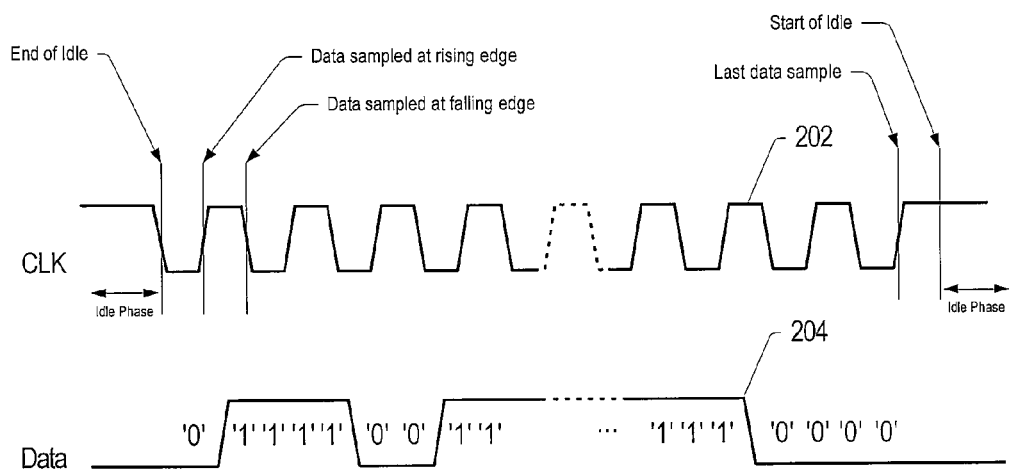
FIG. 2 shows a sample timing diagram illustrating the data transfer operation of the 2-wire bidirectional bimodal bus.

FIG. 2 shows a sample timing diagram illustrating the data transfer operation of the 2-wire bus, with CLK line 202 and Data line 204 transitioning from an Idle state, to a data transfer state, and back to an idle state at the end of the transfer. As shown in the diagram, the data may be clocked on both the rising and falling edges of the clock, implementing a DDR transfer protocol. When the data transmission is complete, the bus may return to an idle state. In typical USB system topology, a host coupling to a device generally operates as a master device and the device operates as a slave device, but both the host and the device are capable of driving signal states or data onto the bus. The Host device may place weak keepers (a weak pull-up on the clock line, and a weak pull-down on the data line) on the bus when the bus is in the idle state, and may remove the keepers when a data transfer occurs. When data is driven onto the bus, the transmitting device may also drive the clock signal synchronously with the data.

As previously mentioned, in addition to Idle and Data transmission states, 2-wire bus 110 may be configured to also support USB Reset, USB Resume, and USB Suspend. These states may be implemented as driven states, and may overdrive the weak keepers, permitting a USB device to send a Wake-up signal to a suspended USB host, thereby precipitating a wake event. It should be noted that a USB host may similarly send out a Resume signal to a suspended USB device, waking up the bus in a similar manner. Thus, a Resume signal and a Wake-up signal may be considered to be functionally identical, with the former indicating a host driven event and the latter indicating a device driven event.

Figure 3:
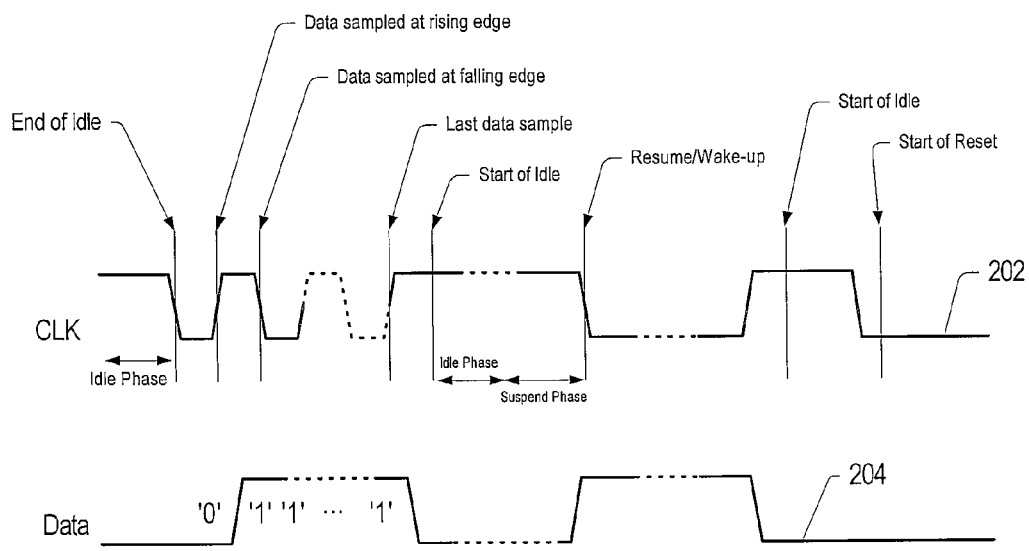
FIG. 3 shows a sample timing diagram illustrating the data transfer, USB suspend, and USB resume operations of the 2-wire bidirectional bimodal bus.

FIG. 3 shows a sample timing diagram illustrating the USB Reset, USB Suspend, and USB Resume operations of the 2-wire bus in addition to the Idle and Data transmission states. Similar to FIG. 1, 2-wire bus 110 may be in the Idle state while CLK line 202 is held high and Data line 204 is held low for one or more clock periods. Once the end of the Idle state is reached, data may be sampled at both the rising edges and falling edges of CLK signal 202. Following the last sampled data, the Idle state may again be entered by holding CLK line 202 high and Data line 204 low. A USB Suspend mode may be entered by extending to 3 ms the time period during which CLK line 202 is held high and Data line 204 is held low, to match current USB specification requirements. USB Attach or Resume mode may be entered by transitioning CLK line 202 from high to low, and transitioning Data line 204 from low to high, maintaining the new states for at least 1 ms to match current USB specification requirements. As also illustrated in the timing diagram shown in FIG. 3, USB Reset may be actuated by holding both CLK line 202 and Data line 204 low for 2.5 μs or 10 ms, to match current USB specification requirements. It should be noted that the respective timing periods during which the state of CLK line 202 and the state of Data line 204 are held constant for respectively conveying USB Attach/Resume state, USB Suspend state and/or USB Reset state, may be shortened for performance enhancement.

In general, a 2-wire (minimum configuration) interconnect bus may be configured to have command/control state information transmitted over the same line(s) over which data is transmitted, without driving a signal (i.e. using static states.) The interconnect bus may be used for protocols other than USB, as long as the protocol is designed to prevent two sources from writing to the bus at the same time or otherwise prevent bus contention through an inherent/built-in handshake mechanism, if the interconnect bus does not have a request/grant structure. Status information may be conveyed on the interconnect bus by line states being held for certain specified time periods. In other words, static states held for certain time periods may convey information in the absence of a clock and/or other edge information.

In some embodiments, the interconnect bus interface may be implemented using standard I/O drivers, which may be tri-stated during operation when not being driven. The clock line and the data line may both be bidirectional. Data transfer may be configured according to a DDR scheme (to increase efficiency at lower clock speeds), and the clock frequency may be set to any value required to maintain a desired effective data rate for specific transfer requirements. (i.e. 6 MHz for FS USB, 533 MHz to match DDR memory speeds common on today's PC motherboards, etc. . . . ). The interconnect bus specifications may thus be extended to USB 3.0 and beyond, by simply increasing the clock frequency. For higher data rates with the same clock source frequency, the number of data lines may also be increased, and any or all of the data lines may be configured as bidirectional data lines. In one set of embodiments, the signaling voltage level used may implementation dependent, and may be set to any level as long as the transmitting device and the receiving device operate at compatible voltage levels. For example, 1.8V signaling may be implemented, but alternative voltage classes, such as 1.2V, may be specified as well.

A device operating as a host when coupled to the interconnect bus may implement weak bus keepers (i.e. apply weak pull-up/pull-down) to maintain a bus idle state when no active transfers are in progress. The host device may temporarily remove the weak keepers while transmitting and/or receiving data. In one set of embodiments this may be accomplished by the device (i.e. the device that is not operating as a host)

establishing an Idle state for a specified number (e.g. 2) of clock cycles after final data transmission by driving the clock line high and the data line low—as shown for example in FIGS. 2 and 3—during which time period the device operating as a host may apply the Idle state weak keepers, effectively pulling up the clock line and pulling down the data line. In one set of embodiments, a simple spread spectrum clicking scheme may be used to reduce effects of EMI since the data and clock edges are always synchronous to each other, making it possible to vary them in the frequency domain without difficulty. Some embodiments may be implemented using slew rate controlled I/O ports to further reduce and/or eliminate effects of EMI.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

I claim:

1. A method comprising:
    transmitting data, which is formatted according to a specified bus protocol, onto a first signal line according to the specified bus protocol, when operating in data transmission mode;
    wherein the data is not transmitted when operating in static state mode;
    transmitting, source-synchronously with the data, a clock signal onto a second signal line when operating in data transmission mode;
    wherein the clock signal is not transmitted when operating in static state mode; and
    when operating in static state mode, conveying, over the first signal line and the second signal line, command/control state information associated with the bus protocol, by driving different respective combinations of static states on the first signal line and the second signal line, wherein the different respective combinations of driven static states correspond to different respective command/control states indicated by the command/control state information.

2. The method of claim 1, wherein said conveying command/control state information comprises driving the first signal line and the second signal line to specific respective logic levels for the duration of a specified time period, wherein the specified time period satisfies timing specifications set forth in the specified bus protocol.

3. The method of claim 2, wherein said driving the first signal line and the second signal line to specific respective logic levels comprises respectively applying weak pull-up/pull-down to the first signal line and to the second signal line.

4. The method of claim 1, wherein said transmitting data onto the first signal line and said transmitting the clock signal onto the second signal line are performed by a device which does not comprise physical layer (PHY) circuitry defined in the specified bus protocol.

5. The method of claim 1, wherein the command/control states comprise one or more of:
    Idle state;
    Attach/Resume state;
    Suspend state; or
    Reset state.

6. The method of claim 1, wherein the specified bus protocol is the Universal Serial Bus (USB) protocol.

7. The method of claim 6, wherein the command/control states comprise two or more of:
    USB Idle state;
    USB Attach/Resume state;
    USB Suspend state; or
    USB Reset state.

8. The method of claim 1,
    wherein the specified bus protocol is the Universal Serial Bus (USB) protocol;
    wherein the command/control states comprise a USB Idle state;
    the method further comprising conveying the USB Idle state by driving the first signal line low and the second signal line high for a specified time period.

9. The method of claim 1,
    wherein the specified bus protocol is the Universal Serial Bus (USB) protocol;
    wherein the command/control states comprise a USB Attach/Resume state;
    wherein the USB Attach/Resume state is conveyed by driving the first signal line high and the second signal line low for a specified time period.

10. The method of claim 1,
    wherein the specified bus protocol is the Universal Serial Bus (USB) protocol;
    wherein the command/control states comprise a USB Suspend state;
    wherein the USB Suspend state is conveyed by driving the first signal line low and the second signal line high for a specified time period.

11. The method of claim 1,
    wherein the specified bus protocol is the Universal Serial Bus (USB) protocol;
    wherein the command/control states comprise a USB Reset state;
    wherein the USB Reset state is conveyed by driving the first signal line low and the second signal line low for a specified time period.

12. The method of claim 1, wherein said transmitting data and said transmitting the clock signal are performed by:
    a first device when said receiving is performed by a second device; and
    the second device when said receiving is performed by the first device.

13. The method of claim 1, further comprising:
    receiving the transmitted data and the transmitted clock signal; and
    sampling the received data using pulses of the received clock signal.

14. The method of claim 13;
    wherein said transmitting data and said transmitting the clock signal are performed by a first device;
    wherein said receiving the transmitted data and said sampling the received data are performed by a second device; and
    wherein said conveying command/control state information comprises one of the first device and the second device driving the first signal line and the second signal line to specific respective logic levels for the duration of a specified time period, wherein the specified time period satisfies timing specifications set forth in the specified bus protocol.

15. The method of claim 13, wherein said sampling comprises sampling the received data on respective rising edges of the pulses of the received clock signal and on respective falling edges of the pulses of the received clock signal.

16. The method of claim 1, wherein said transmitting the data and said transmitting the clock signal is performed between a first device and a second device;
the method further comprising:
transmitting data, which is formatted according to the specified bus protocol, between the second device and a third device over the first line of the interconnect bus according to the specified bus protocol; and
transmitting a clock signal between the second device and the third device over the second line of the interconnect bus source-synchronously with said transmitting the data between the second device and the third device over the first line.

17. The method of claim 16, further comprising:
transmitting data, which is formatted according to the specified bus protocol, between the third device and a fourth device;
wherein the specified bus protocol is a universal serial bus (USB) protocol;
wherein the second device is a USB hub and the fourth device is a USB host;
wherein the first device appears as a USB device to the USB host; and
wherein the first device appears as a USB host to the second device.

18. The method of claim 17, wherein the second device appears as a USB device to the first device and to the USB host device.

19. The method of claim 17, wherein said transmitting data between the third device and a fourth device comprises transmitting data between the third device and a fourth device over a standard USB connection.

20. The method of claim 1, wherein said transmitting the clock signal is performed only during said transmitting the data.

21. The method of claim 1, wherein the specified bus protocol is a universal serial bus (USB) protocol, and said transmitting the data, said transmitting the clock signal, and said conveying the command/control state information are performed by a device operating as both a USB host and a USB endpoint device.

22. The method of claim 21, further comprising:
the device receiving USB data from the first signal line;
the device receiving a clock signal corresponding to the USB data over the second signal line; and
the device sampling the received USB data using received clock signal.

23. The method of claim 1, wherein said transmitting the data, said transmitting the clock signal, and said conveying the command/control state information are performed by a device configured to:
control a first device; and
be controlled by a second device.

24. A method comprising:
receiving data, which is formatted according to a specified bus protocol, over a first signal line of an interconnect bus according to the specified bus protocol when operating in data transmission mode;
wherein the data is not received when operating in static state mode;
receiving a clock signal source-synchronously with the received data over a second signal line of the interconnect bus when operating in data transmission mode;
wherein the clock signal is not received when operating in static state mode;
sampling the received data using the received clock signal when operating in data transmission mode; and
when operating in static state mode, detecting, over the first signal line and the second signal line, command/control state information associated with the bus protocol, by detecting respective combinations of static states driven on the first signal line and driven on the second signal line, wherein the respective combinations of static states driven on the first signal line and the second signal line correspond to respective command/control states indicated by the specified command/control state information.

25. The method of claim 24, wherein said detecting command/control state information comprises detecting the first signal line and the second signal line at specific respective logic levels for the duration of a specified time period, wherein the specified time period satisfies timing specifications set forth in the specified bus protocol.

26. The method of claim 24, further comprising:
applying weak pull-up/pull-down to the first signal line and to the second signal line to maintain an idle state on the interconnect bus when no active data transfer is taking place over the first signal line; and
temporarily removing the weak pull-up/pull-down when active data transfer is taking place over the first signal line.

27. The method of claim 24, further comprising:
during one or more time periods when said receiving the data and said receiving the clock signal are not performed, conveying, over the first signal line and the second signal line, command/control state information associated with the bus protocol, by driving respective combinations of static states on the first signal line and the second signal line, wherein the respective combinations of driven static states correspond to respective command/control states indicated by the specified command/control state information.

28. The method of claim 27, wherein said conveying the command/control state information comprises:
driving the first signal line to one of a logic high value and a logic low value, for the duration of a specified time period; and
driving the second signal line to one of the logic high value and the logic low value, for the duration of the specified time period;
wherein the specified time period satisfies timing requirements associated with the specified bus protocol.

29. The method of claim 24, wherein said sampling the received data comprises sampling the received data on respective rising edges of pulses of the clock signal and/or on respective falling edges of the pulses of the clock signal.

30. The method of claim 24, further comprising driving the respective combination of static states for each respective command/control state for a respective specified time period satisfying timing requirements set forth in the specified bus protocol.

31. The method of claim 24, wherein said receiving the data over the first signal line and said receiving the clock signal over the second signal line do not utilize physical layer (PHY) circuitry defined in the specified bus protocol.

32. The method of claim 24, wherein the command/control states comprise one or more of:
- Idle state;
- Attach/Resume state;
- Suspend state; or
- Reset state.

33. The method of claim 24, wherein the specified bus protocol is the Universal Serial Bus (USB) protocol.

34. The method of claim 24, wherein the command/control states comprise two or more of:
- USB Idle state;
- USB Attach/Resume state;
- USB Suspend state; or
- USB Reset state.

35. The method of claim 24,
wherein the specified bus protocol is the Universal Serial Bus (USB) protocol;
wherein the command/control states comprise a USB Idle state;
the method further comprising conveying the USB Idle state by driving the first signal line low and the second signal line high for a specified time period.

36. The method of claim 24,
wherein the specified bus protocol is the Universal Serial Bus (USB) protocol;
wherein the command/control states comprise a USB Attach/Resume state;
wherein the USB Attach/Resume state is conveyed by driving the first signal line high and the second signal line low for a specified time period.

37. The method of claim 24,
wherein the specified bus protocol is the Universal Serial Bus (USB) protocol;
wherein the command/control states comprise a USB Suspend state;
wherein the USB Suspend state is conveyed by driving the first signal line low and the second signal line high for a specified time period.

38. The method of claim 24,
wherein the specified bus protocol is the Universal Serial Bus (USB) protocol;
wherein the command/control states comprise a USB Reset state;
wherein the USB Reset state is conveyed by driving the first signal line low and the second signal line low for a specified time period.

39. The method of claim 24, wherein the first signal line and the second signal line are bidirectional signal lines, the method further comprising:
a first device transmitting the data over the first signal line and transmitting the clock signal over the second signal line, and a second device performing said receiving the data, said receiving the clock signal, and said sampling the received data; and
the second device transmitting the data over the first signal line and transmitting the clock signal over the second signal line, and the first device performing said receiving the data, said receiving the clock signal, and said sampling the received data.

40. The method of claim 24, wherein the specified bus protocol is a universal serial bus (USB) protocol, and said receiving the data, said receiving the clock signal, said sampling the received data, and said conveying the command/control state information are performed by a device operating as both a USB host and a USB endpoint device.

41. The method of claim 40, further comprising:
the device transmitting USB data onto the first signal line;
the device transmitting a clock signal corresponding to the USB data onto the second signal line, wherein the transmitted clock signal is intended for sampling the transmitted USB data.

42. The method of claim 24, wherein said receiving the data, said receiving the clock signal, said sampling the received data, and said conveying the command/control state information are performed by a device configured to:
control a first device; and
be controlled by a second device.

43. The method of claim 24, wherein said receiving the data, said receiving the clock signal, said sampling the received data, and said conveying the command/control state information are performed by a device operating as:
a master device with respect to a first device; and
a slave device with respect to a second device.

44. A method comprising:
transmitting data, which is formatted according to a specified bus protocol between, a first device and a second device over a bidirectional data line when operating in data transmission mode;
wherein the data is not transmitted when operating in static state mode;
transmitting a clock signal source-synchronously with the transmitted data between the first device and the second device over a bidirectional clock line when operating in data transmission mode;
wherein the clock signal is not transmitted when operating in static state mode;
sampling the transmitted data using the clock signal when operating in data transmission mode; and
when operating in static state mode, conveying command/control state information defined by the specified bus protocol and recognized by the first device and the second device over the bidirectional data line and the bidirectional clock line, by driving static states onto the bidirectional clock line and the bidirectional data line, wherein respective combinations of the driven static states correspond to different respective command/control states indicated by the command/control state information.

45. The method of claim 44, wherein said driving the static states comprises:
holding the bidirectional clock line in one of a high state and a low state, for a specific duration; and
holding the bidirectional data line in one of the low state and the high state, for the specific duration;
wherein the specific duration is determined by requirements of the specified bus protocol.

46. The method of claim 44, further comprising:
applying weak pull-up/pull-down to the bidirectional data line and to the bidirectional clock line to maintain an idle state when no active data transfer is taking place over the bidirectional data line; and
temporarily removing the weak pull-up/pull-down when active data transfer is taking place over the bidirectional data line.

47. The method of claim 44, wherein when said transmitting the data and said transmitting the clock signal are performed by the first device;
the method further comprising:
the second device receiving the transmitted data over the bidirectional data line, receiving the transmitted clock signal over the bidirectional clock line, and performing said sampling.

48. The method of claim 44, wherein said sampling the transmitted data comprises sampling the transmitted data on respective rising edges of pulses of the clock signal and/or on respective falling edges of the pulses of the clock signal.

49. The method of claim 44, further comprising:
   the second device performing said transmitting the data over the bidirectional data line and said transmitting the clock signal over the bidirectional data line; and
   the first device receiving the transmitted data, receiving the clock signal, and performing said sampling.

50. The method of claim 44, wherein the specified bus protocol is the Universal Serial Bus (USB) protocol, and wherein at least one of the first device and the second device is configured to operate as both a USB host and a USB endpoint device.

51. The method of claim 44, wherein at least one of the first device and the second device is configured to:
   control the other one of the first device and the second device; and
   be controlled by a third device.

52. The method of claim 44, wherein said transmitting the data over the bidirectional data line and said transmitting the clock signal over the bidirectional clock line do not utilize physical layer (PHY) circuitry defined in the specified bus protocol.

53. The method of claim 44, wherein the command/control states comprise one or more of:
   Idle state;
   Attach/Resume state;
   Suspend state; or
   Reset state.

54. The method of claim 44, wherein the specified bus protocol is the Universal Serial Bus (USB) protocol.

55. The method of claim 54, wherein the command/control states comprise one or more of:
   USB Idle state;
   USB Attach/Resume state;
   USB Suspend state; or
   USB Reset state.

56. The method of claim 44,
   wherein the specified bus protocol is the Universal Serial Bus (USB) protocol;
   wherein the command/control states comprise a USB Idle state;
   the method further comprising conveying the USB Idle state by driving the first signal line low and the second signal line high for a specified time period.

57. The method of claim 44,
   wherein the specified bus protocol is the Universal Serial Bus (USB) protocol;
   wherein the command/control states comprise a USB Attach/Resume state;
   wherein the USB Attach/Resume state is conveyed by driving the first signal line high and the second signal line low for a specified time period.

58. The method of claim 44,
   wherein the specified bus protocol is the Universal Serial Bus (USB) protocol;
   wherein the command/control states comprise a USB Suspend state;
   wherein the USB Suspend state is conveyed by driving the first signal line low and the second signal line high for a specified time period.

59. The method of claim 44,
   wherein the specified bus protocol is the Universal Serial Bus (USB) protocol;
   wherein the command/control states comprise a USB Reset state;
   wherein the USB Reset state is conveyed by driving the first signal line low and the second signal line low for a specified time period.

* * * * *